United States Patent
Yamato et al.

(10) Patent No.: US 12,476,309 B2
(45) Date of Patent: Nov. 18, 2025

(54) HERMETICALLY SEALED BATTERY

(71) Applicant: Panasonic Intellectual Property Management Co., Ltd., Osaka (JP)

(72) Inventors: Kenji Yamato, Osaka (JP); Masao Ootsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 561 days.

(21) Appl. No.: 17/913,744

(22) PCT Filed: Feb. 10, 2021

(86) PCT No.: PCT/JP2021/004884
§ 371 (c)(1),
(2) Date: Sep. 22, 2022

(87) PCT Pub. No.: WO2021/199692
PCT Pub. Date: Oct. 7, 2021

(65) Prior Publication Data
US 2023/0112952 A1    Apr. 13, 2023

(30) Foreign Application Priority Data
Apr. 1, 2020    (JP) .................. 2020-065600

(51) Int. Cl.
*H01M 50/184*    (2021.01)
*H01M 10/0587*    (2010.01)
(Continued)

(52) U.S. Cl.
CPC ..... *H01M 50/184* (2021.01); *H01M 10/0587* (2013.01); *H01M 50/107* (2021.01);
(Continued)

(58) Field of Classification Search
CPC ............ H01M 50/107; H01M 50/152; H01M 10/0587
See application file for complete search history.

(56) References Cited

U.S. PATENT DOCUMENTS
2017/0110699 A1*    4/2017    Kohira .................. H01M 4/525

FOREIGN PATENT DOCUMENTS
JP    2004-335287 A    11/2004
JP    2011-228019 A    11/2011
(Continued)

OTHER PUBLICATIONS

English translation of KR Publication 2018-0080847, Jul. 2018.*
(Continued)

*Primary Examiner* — Brittany L Raymond
(74) *Attorney, Agent, or Firm* — WHDA, LLP

(57) ABSTRACT

A hermetically sealed battery includes: a battery can having a cylindrical shape with a bottom and an opening; an electrode body accommodated in the battery can; and a sealing plate sealing the opening of the battery can. The sealing plate has a first main surface facing an outside of the battery can and a second main surface opposite thereto. The sealing plate includes an outer peripheral portion having a flat plate shape, an inner peripheral portion having a flat plate shape, an inclined portion provided between the outer and inner peripheral portions. The inclined portion is inclined such that the inner peripheral portion is positioned on an outer side of the battery can than the outer peripheral portion. The inclined portion includes a thin portion and a thicker base portion. The thin portion and the base portion are arranged in a radial direction of the sealing plate.

15 Claims, 7 Drawing Sheets

(51) Int. Cl.
*H01M 50/107* (2021.01)
*H01M 50/152* (2021.01)
*H01M 50/167* (2021.01)
*H01M 50/169* (2021.01)

(52) U.S. Cl.
CPC ........ *H01M 50/152* (2021.01); *H01M 50/167* (2021.01); *H01M 50/169* (2021.01)

(56) References Cited

FOREIGN PATENT DOCUMENTS

| | | | |
|---|---|---|---|
| JP | 2016-177877 A | | 10/2016 |
| JP | 2020-047536 A | | 3/2020 |
| KR | 10-2016-0149861 A | | 12/2016 |
| KR | 2018-0080847 | * | 7/2018 |
| WO | 2015/146077 A1 | | 10/2015 |

OTHER PUBLICATIONS

English translation of Search Report dated Sep. 28, 2023, issued in counterpart CN Application No. 202180023556.0. (3 pages).
International Search Report dated May 11, 2021, issued in counterpart application No. PCT/JP2021/004884.

* cited by examiner

COMPARATIVE EXAMPLE

1300

HERMETICALLY SEALED BATTERY

TECHNICAL FIELD

The present invention relates to a hermetically sealed battery including a battery can, an electrode body accommodated in the battery can, and a sealing plate sealing an opening of the battery can.

BACKGROUND ART

Incorrect uses of hermetically sealed batteries such as abnormal charging or discharging of the battery, or throwing the battery into a fire, may cause gas to be generated inside the batteries, increasing an internal pressure of the batteries. As a safeguard for such case, a hermetically sealed battery often includes an explosion-proof valve. The explosion-proof valve opens to prevent the battery from being burst or expanded. The explosion-proof valve is, for example, a thin portion formed by pressing a part of a sealing plate, which is provided to seal the battery can.

PTL1 teaches to a portion of the sealing plate which is located on the inner peripheral side of the thin portion is deviated to be nearer to the bottom of the battery can than the outer peripheral side of the thin portion of the sealing plate.

CITATION LIST

Patent Literature

PTL 1: Japanese Patent Laid-Open Publication No. 2016-177877

SUMMARY OF THE INVENTION

The structure in which the inner circumferential side of the sealing plate deviated to be nearer to the bottom of the battery can than the outer circumferential side as disclosed by PTL 1 increases the operating pressure of the explosion-proof function.

A hermetically sealed battery according to an aspect of the present invention includes: a battery can having a cylindrical shape with a bottom and an opening; an electrode body accommodated in the battery can; and a sealing plate sealing the opening of the battery can. The sealing plate has a first main surface and a second main surface opposite to the first main surface. The first main surface faces an outside of the battery can. The sealing plate includes an outer peripheral portion having a flat plate shape, an inner peripheral portion having a flat plate shape, an inclined portion provided between the outer peripheral portion and the inner peripheral portion. The inclined portion is inclined such that the inner peripheral portion is positioned on an outer side of the battery can than the outer peripheral portion. The inclined portion includes a thin portion and a base portion thicker than the thin portion. The thin portion and the base portion are arranged in a radial direction of the sealing plate.

According to the present invention, a hermetically sealed battery having an explosion-proof function that can operate at a low operating pressure and that is small in variation in the operating pressure is provided.

DESCRIPTION OF EMBODIMENTS

Figure 1:
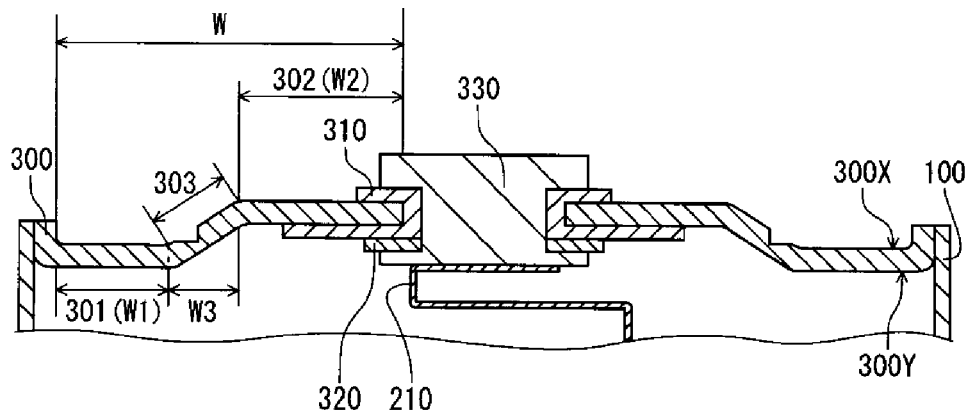
FIG. 1 is a schematic sectional view of a hermetically sealed battery according to an exemplary embodiment of the present invention for showing a major part of the hermetically sealed battery.

A hermetically sealed battery according to the present exemplary embodiment (hereinafter sometimes be referred to simply as a battery) includes: a battery can having a cylindrical shape with a bottom and an opening; an electrode body accommodated in the battery can; and a sealing plate sealing the opening of the battery can. The sealing plate has a first main surface facing toward an outside of the battery can, and a second main surface opposite to the first main surface. The sealing plate includes an outer peripheral portion having a flat plate shape, an inner peripheral portion having a flat plate shape, and an inclined portion provided between the outer peripheral portion and the inner peripheral portion. The inclined portion is inclined such that the inner peripheral portion is disposed on an outer side of the battery can than the outer peripheral portion. The inclined portion includes a thin portion and a base portion that is thicker than the thin portion. The thin portion and the base portion are arranged in a radial direction of the sealing plate.

An increase in the internal pressure of the battery causes a pressure applied to the sealing plate pushing the sealing plate toward outside. This pressure causes the sealing plate to be broken at the thin portion to release the internal pressure. This function is an explosion-proof function. The explosion-proof function prevents the battery from being exploded or expanded.

In the structure disclosed by PTL 1 in which the sealing plate includes an inner peripheral portion displaced inward, the thin portion is first subjected to a compressive stress and then subjected to a tensile stress. Accordingly, the pressure that causes the break of the thin portion (the operating pressure) tends to increase. Further, the thin portion is extended throughout the entire inclined portion of the sealing plate. This configuration prevents the stress concentration, so that the operating pressure tends to vary.

According to the present exemplary embodiment, on the other hand, the sealing plate includes the inclined portion to deviate the inner peripheral portion in an outward direction. This structure allows only the tensile stress to act on the inclined portion when the internal pressure increases. Accordingly, it is possible to operate the explosion-proof function at a lower internal pressure. In addition, the thin portion is provided on a part of the inclined portion. Therefore, the tensile stress further tends to concentrate on the thin portion, accordingly suppressing the variation in the operating pressure.

The battery according to the present exemplary embodiment has a high reliability even in an environment of receiving an external load. In a case, for example, where the sealing plate has the inner peripheral portion deviated inward as disclosed in PTL 1, an external load causes a tensile stress to act on the thin portion. The tensile stress acting on the thin portion for a long time may cause a stress corrosion cracking at the thin portion. According to the present exemplary embodiment, on the other hand, no tensile stress acts on the thin portion, so that the stress corrosion cracking hardly occurs.

From the viewpoint of preventing the contents in the battery from scattering, the operating pressure of the explosion-proof function may preferably be equal to or smaller than 5.5 MPa, more preferably equal to or smaller than 5.3 MPa, and most preferably equal to or smaller than 5.0 MPa. The explosion-proof function operating pressure of the hermetically sealed battery according to the present exemplary embodiment can be within this range.

Inclined Portion

The inclined portion is inclined such that the inner peripheral portion is positioned on an outer side of the battery can than the outer peripheral portion. The inclined portion may be formed, for example, by a pressing work.

An inclination angle of the inclined portion is not particularly limited. For example, an exterior angle A formed by a part of a second main surface at the outer peripheral portion and a part of the second main surface at the inclined portion (hereinafter referred to as an inclination angle A) may be larger than 0° and equal to or smaller than 90°. An exterior angle formed by a part of the second main surface at the inner peripheral portion and the part of the second main surface at the inclined portion may also be larger than 0° and equal to or smaller than 90°.

In other words, the inclined portion is a region between a position at which the angle A formed by the part of the second main surface at the area and the part of the second main surface at the outer peripheral portion exceeds 0° and a position at which the angle A formed by the part of the second main surface at the area and the part of the second main surface at the inner peripheral portion exceeds 0°. The part of the second main surface at the outer peripheral portion is substantially parallel to the part of the second main surface at the inner peripheral portion.

Considering the tendency that the tensile stress is more likely to act on the thin portion, the inclination angle A may preferably be equal to or larger than 25°, and more preferably equal to or larger than 30°. From the same point of consideration, the inclination angle A may preferably be equal to or smaller than 75°, more preferably be equal to or smaller than 70°, and most preferably be equal to or smaller than 65°. For example, the inclination angle A may be equal to or larger than 25° and equal to or smaller than 75°. The inclination angle A is an average value of inclination angles A which are measured on three different cross-sectional planes obtained by cutting the sealing plate in radial directions R (hereinafter referred to as cross sections R).

The location at which the inclined portion is provided may not particularly be limited and may be appropriately determined depending, for example, on the radius of the sealing plate. In a projection drawing drawn when the sealing plate is viewed from the normal of the part of the first main surface at the inner peripheral portion, a length from the outer edge of the outer peripheral portion to the inner edge of the inner peripheral portion is referred to as a total width W. The inclined portion is disposed in a region which is inner than 3% of the total width W from the outer edge of the outer peripheral portion and within 90% of the total width W from the outer edge of the outer peripheral portion, preferably within 70% of the total width W from the outer edge of the outer peripheral portion.

The width of the inclined portion may not particularly be limited and may be appropriately determined depending, for example, on the radius of the sealing plate. The width W3 of the inclined portion may be equal to or larger than 5% and equal to or smaller than 90% of the total width W, or equal to or larger than 10% and equal to or smaller than 50% of the total width W, or equal to or larger than 15% and equal to or smaller than 30% of the total width W. The width W3 of the inclined portion is an average of lengths between an outer edge and an inner edge of the inclined portion which are measured along straight lines drawn to extend in three different radial directions R on the above-mentioned projection drawing. The width W3 of the inclined portion may be calculated by subtracting a width W1 of the outer peripheral portion and a width W2 of the inner peripheral portion from the total width W. The outer edge of the inclined portion is identical to the boundary between the outer peripheral portion and the inclined portion. The inner edge of the inclined portion is identical to the boundary between the inclined portion and the inner peripheral portion.

The inclined portion includes a thin portion, and a base portion that is thicker than the thin portion. The thin portion and the base portion are arranged in a radial direction R of the sealing plate. This structure allows the tensile stress to more likely concentrate on the thin portion, and suppresses the variation in the operating pressure of the explosion-proof function.

Thin Portion

The thin portion is implemented by a groove formed in the first main surface facing the outside of the battery can at the inclined portion. The groove has an arcuate shape along the surface. The groove may be formed by recessing the first surface at a part of the inclined portion by, for example, a pressing work or a cutting work. From the viewpoint of improving the productivity and easiness of suppressing the variation in the operating pressure, the second main surface at the inclined portion is kept flat without forming any recesses or protrusions on the second main surface at the inclined portion.

The mechanical strength of the sealing plate tends to increase at the boundary between the outer peripheral portion and the inclined portion and the boundary between the inclined portion and the inner peripheral portion by the pressing work for forming the inclined portion. Accordingly, in the structure in which the sealing plate is provided with the inclined portion according to the present exemplary embodiment, the difference in the amount of deformation between the inner peripheral side and the outer peripheral side of each of the boundaries increases with the increase in the internal pressure. As a result, a stress concentrates to the region between the two boundaries, or at the inclined portion. However, since the outer edge of the sealing plate is fixed to the battery can, the amount of deformation of the outer peripheral portion per se is small. Therefore, the difference in the amount of deformation at the boundary between the outer peripheral portion and the inclined portion becomes larger than the difference in the amount of deformation at the boundary between the inclined portion and the inner peripheral portion. Therefore, the stress concentrates more on the outer peripheral portion side of the inclined portion.

From the above-described point of view, the bottom of the groove may be located preferably in a portion of the inclined portion closer to the outer peripheral portion. The tensile stress concentrates on the bottom of the groove. An increase in the internal pressure pushes up the inclined portion and the inner peripheral portion in a direction toward outside from the bottom of the groove. On the other hand, the amount of deformation of the outer peripheral portion is small. Therefore, the sealing plate breaks rapidly at the bottom of the groove. At least a part of the bottom of the groove may be located in a region within 50% of the width W3 of the inclined portion from the outer edge of the inclined portion.

Particularly, a condition of h/H≤45% is preferably satisfied, where h is a height from the part of the second main surface at the outer peripheral portion to the bottom of the groove, and H is a height from the part of the second main surface at the outer peripheral portion to the part of the first main surface at the inner peripheral portion. Upon being satisfied, this condition causes the bottom of the groove to be close enough to the boundary between the outer peripheral portion and the inclined portion. It is preferable to satisfy a condition expressed as h/H≤40%. It is preferable to satisfy a condition expressed as h/H≤35%.

The bottom of the groove is the deepest portion of the groove. Specifically, the bottom of the groove is a position on the first main surface that is shortest in distance to the second main surface in cross section R. In a case where plural positions on the first main surface are shortest in distance to the second main surface, the bottom is an entire straight line connecting two such positions at opposite ends.

The height h is a height from the part of the second main surface at the outer peripheral portion to the bottom of the groove. In a case where the bottom is a straight line, the height h is a height from the part of the second main surface at the outer peripheral portion to the midpoint of the bottom of the groove.

The height H is a height from the part of the second main surface at the outer peripheral portion to a position on the part of the first main surface at the inner peripheral portion that is closest to the inclined portion. Each of the height h and the height H is an average of the corresponding heights which are respectively measured on three different cross sections R.

The location of the entire groove may not particularly be limited and may be appropriately determined depending, for example, on the location of the inclined portion. Considering the tendency that the tensile stress becomes more likely to concentrate on the groove, the entire grove is preferably located also at a position closer to the outer circumferential side of the inclined portion. For example, at least a part of the groove may be located in a region within 50% of the width of the inclined portion from the outer edge of the inclined portion.

The cross-sectional shape of the groove may not particularly be limited. In cross section R, inner walls of the groove include, for example, the bottom portion, and first and second side surface portions connecting the bottom portion and the first main surface. The shape of the bottom portion of the groove may be either a straight shape, an arcuate shape, or a point shape. Considering the workability, the shape of the bottom portion of the groove may be either a straight or arcuate shape. The radius of curvature of an arcuate bottom portion may not particularly be limited and may, for example, be equal to or larger than 0.01 mm and equal to or smaller than 1 mm.

In a case where the bottom portion has a straight line shape, the width of the bottom portion of the groove is preferably as narrow as possible. The reason for this is that the narrower bottom portion of the groove allows the tensile stress to be more likely to concentrate on the bottom portion of the groove. For example, the width Wb of the bottom portion of the groove and a thickness D of the base portion may preferably satisfy a condition of Wb/D≤50%. A condition of Wb/D≤40% is preferably satisfied. A condition of Wb/D≤30% is more preferably satisfied.

The width Wb of the bottom portion of the groove may, for example, be equal to or smaller than 0.5 mm. The width Wb of the bottom portion of the groove may, for example, be equal to or larger than 0.01 mm, or equal to or larger than 0.03. In a case where the width Wb of the bottom portion is 0.01 mm, the cross-sectional shape of the bottom portion is a point-shape.

The cross-sectional shape of the groove is a shape of the groove on cross section R. The width Wb of the bottom portion of the groove is an average of lengths of the first main surface at the bottom portion of the groove which are respectively measured on three different cross sections R. The thickness D of the base portion is an average of thicknesses of the base portion which are respectively measured on three different cross sections R.

Considering the tendency that the tensile stress becomes more likely to concentrate on the bottom portion of the groove, the width of the groove may preferably decrease as closer to the second main surface. In other words, the first side surface portion and the second side surface portion may preferably be inclined such that the width of the groove increases as closer to the first main surface from the bottom portion.

An angle B formed by the first side surface portion and the second side surface portion (hereinafter referred to as opening angle B) may preferably be equal to or larger than 30°, and more preferably be equal to or larger than 45°. The opening angle B may preferably be equal to or smaller than 120°, and more preferably be equal or smaller than 100°. The opening angle B may, for example, be equal to or larger than 30° and equal to or smaller than 120°.

The opening angle B is an angle formed by two straight lines respectively connecting the two respective intersecting points of the inner walls of the groove and the first main surface to the midpoint of the bottom portion of the groove. The opening angle B is an average of opening angles which are respectively measured on three different cross sections R.

A central angle C of the groove (hereinafter be referred to as bent angle C) may not particularly be limited. The bent angle C may preferably be equal to or larger than 60°. This angle allows the sealing plate to easily break, accordingly reducing the operating pressure. Accordingly, scattering of the contents can also be suppressed. The bent angle C may be equal to or larger than 180°. Also, the bent angle C may be 360°, or may be smaller than 360°, or may be equal to or smaller than 270°. Bent angle C is preferably equal to or larger than 60° and equal to or smaller than 270°.

The bent angle C of the groove is an angle formed by a straight line that is drawn in a radial direction to pass through one end of the groove in the circumferential direction of the groove and a straight line drawn in the radial direction R of the sealing plate to pass through the other end of the groove.

The thickness of the thin portion may not particularly be limited. The thickness d of the thin portion may be equal to or larger than 5% and equal to or smaller than 30%. The thickness of the thin portion in this range allows the sealing plate to easily exert the explosion-proof function at a low operating pressure, while maintaining the strength of the sealing plate. The thickness d of the thin portion may be equal to or larger than 7% of the thickness D of the base portion or may be equal to or larger than 10% of the thickness D of the base portion. The thickness d of the thin portion may be equal to or smaller than 25% of the thickness D of the base portion.

The thickness of the thin portion is the minimum distance from the second main surface to the thin portion on cross section R. The thickness d of the thin portion is an average of thicknesses of the thin portion which are respectively measured on three different above-mentioned cross sections R.

Base Portion

The base portion is thicker than the thin portion. The thickness D of the base portion may not particularly be limited and may be about the same as a thickness D1 of the outer peripheral portion and/or a thickness D2 of the inner peripheral portion. The thickness D of the base portion may, for example, be about ±10% of the thickness D1 and/or the thickness D2.

Outer Peripheral Portion

The outer peripheral portion is a flat annular part of the sealing plate surrounding the inclined portion. The width of the outer peripheral portion may not particularly be limited and may be appropriately determined depending, for example, on the radius of the sealing plate. The width of the outer peripheral portion may, for example, be equal to or larger than 3% and equal to or smaller than 80% of the total width W. The thickness D1 of the outer peripheral portion also may not particularly be limited. The thickness D1 of the outer peripheral portion may, for example, be equal to or larger than 0.2 mm and equal to or smaller than 0.5 mm.

Inner Peripheral Portion

The inner peripheral portion is a part of the sealing plate which is a donut-shape portion surrounded by the inclined portion. The width of the inner peripheral portion may not particularly be limited and may be appropriately determined depending, for example, on the radius of the sealing plate. The width of the inner peripheral portion may, for example, be equal to or lager than 10% and equal to or smaller than 90% of the total width W. The thickness D2 of the inner peripheral portion also may not particularly be limited. The thickness D2 of the inner peripheral portion may, for example, be equal to or larger than 0.2 mm and equal to or smaller than 0.5 mm.

A hermetically sealed battery according to the present exemplary embodiment will be described below with reference to the drawings. However, the present exemplary embodiment is not limited to that described hereinafter. FIG. 1 is a schematic sectional view of a hermetically sealed battery according to the present exemplary embodiment for showing a major part of the hermetically sealed battery. In the following figures, members having a same function are denoted by a same reference mark.

Sealing plate 300 is fixed to battery can 100 at a position close to an opening of battery can 100 so as to seal the opening. Sealing plate 300 is an annular plate having first main surface 300X facing the outside of the battery can, and second main surface 300Y opposite to first main surface 300X. Sealing plater 30 has a through-hole S provided in the center thereof (see, for example, FIG. 2). External terminal 330 having an end pressed is fixed to sealing plate 300 through insulating gasket 310 and washer 320 in the through-hole formed at the center of sealing plate 300. External terminal 330 is connected to an end of internal lead wire 210 extended from a negative electrode or a positive electrode constituting an electrode body. Hereinafter, the entire of sealing plate 300, gasket 310, washer 320, and external terminal 330 will be referred to as a sealing body. However, the structure of sealing plate 300 and the sealing body may not be limited to the structure shown here.

Sealing plate 300 includes outer peripheral portion 301, inner peripheral portion 302, and inclined portion 303 provided between outer peripheral portion 301 and inner peripheral portion 303. Inclined portion 303 includes a thin portion. An increase in the internal pressure of the battery causes a pressure pushing up sealing plate 300 in an outward direction. At this moment, a tensile stress concentrates on the thin portion. Finally, the sealing plate is broken at the thin portion, or the explosion-proof function operates to release the internal pressure.

Figure 2:
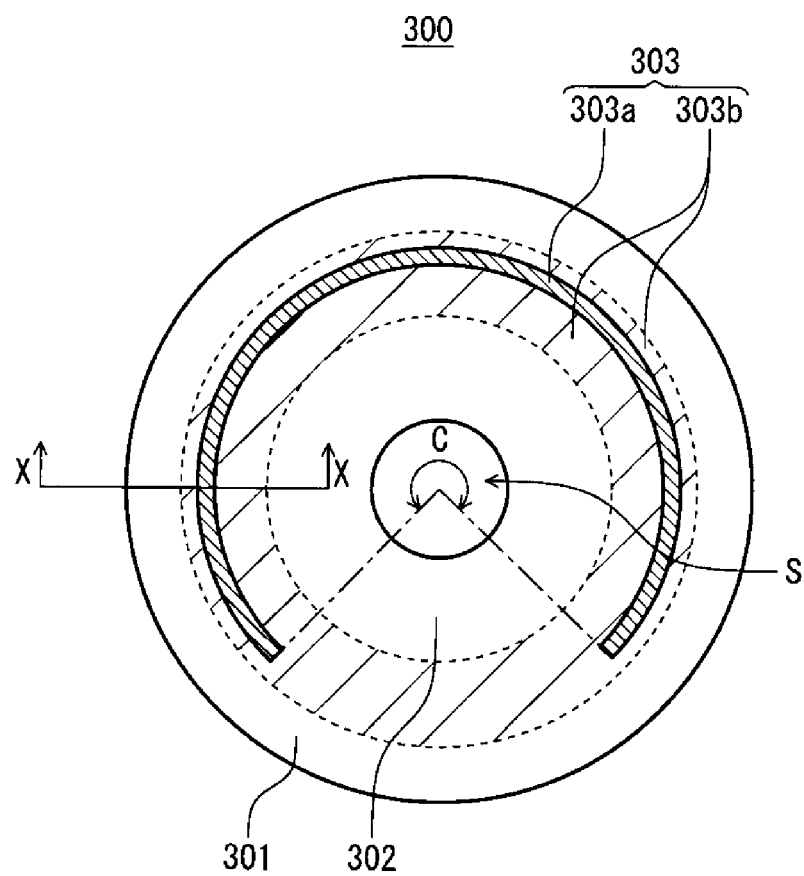
FIG. 2 is a schematic upper view of the battery for showing a sealing plate according to an exemplary embodiment of the present invention.
Figure 3:
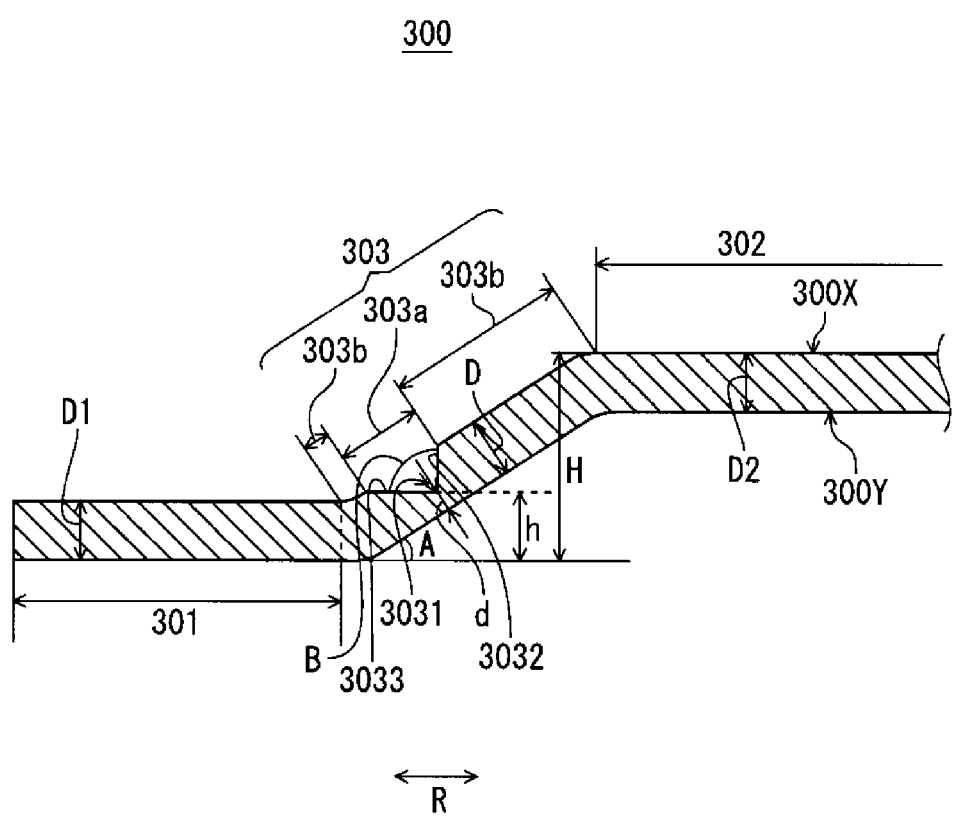
FIG. 3 is a sectional view of the sealing plate along a line X-X shown in FIG. 2.

Next, the sealing plate will be specifically described with reference to FIGS. 2 and 3. However, the sealing plate according to the present exemplary embodiment should not be limited to the one described here. FIG. 2 is a schematic upper view of the sealing plate according to the present exemplary embodiment. FIG. 3 is a sectional view of the sealing plate along line X-X shown in FIG. 2. In FIG. 2, the inclined portion and the thin portion are indicated by hatching. The line X-X is extended in radial direction R. In FIGS. 2 and 3, an outer edge portion of the sealing plate that is used for fixing the sealing plate to the battery case is omitted.

Sealing plate 300 includes outer peripheral portion 301, inner peripheral portion 302, and inclined portion 303 disposed between outer peripheral portion 301 and inner peripheral portion 303. Through-hole S is formed in the center of sealing plate 300. The inclined portion is disposed in a region inner than 3% of the total width W and within 90% of the total width W from the outer edge of outer peripheral portion 301. The width W3 of the inclined portion is equal to or larger than 5% and equal to or smaller than 90% of the total width W. The bent angle C is equal to or larger than 60° and equal to or smaller than 70°. The inclination angle A of inclined portion 303 is equal to or larger than 25° and equal to or smaller than 75°.

Inclined portion 303 includes thin portion 303a and base portion 303b which is thicker than thin portion 303a. Thin portion 303a and base portion 303b are arranged in radial direction R. Thin portion 303a is a groove having an arcuate shape and formed in first main surface 300X at inclined portion 303.

Inner walls of the groove include bottom portion 3031 includes first side surface portion 3032 and second side surface portion 3033. Bottom portion 3031 is an intersection of the two side surface portions. The thickness d of bottom portion 3031 may be equal to or larger than 5% and equal to or smaller than 30% of the thickness D of base portion 303b. The thickness D of base portion 303b is approximately the same as the thickness D1 of outer peripheral portion 301 and the thickness D2 of inner peripheral portion 302. The opening angle B formed by first side surface portion 3032 and second side surface portion 3033 may be approximately 90°.

The height h from second main surface 300Y at outer peripheral portion 301 to bottom portion 3031 of the groove and the height H from second main surface 300Y at outer peripheral portion 301 to first main surface 300X at inner peripheral portion 302 may satisfy a condition of $h/H \le 45\%$.

At least a part of bottom portion 3031 of the groove and the groove are located in a region within 50% of the width W3 of inclined portion 303 from the outer edge of inclined portion 303.

Figure 4A:
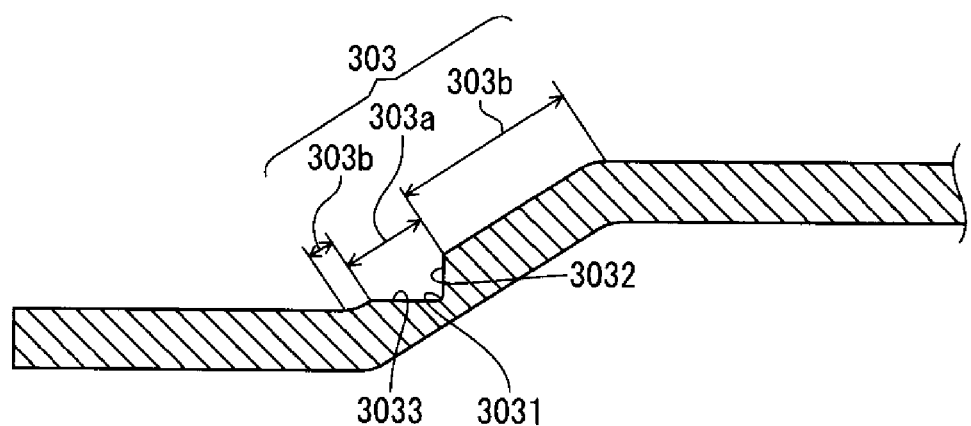
FIG. 4A is an enlarged schematic sectional view of a sealing plate according to another exemplary embodiment of the present invention for showing a major part of the sealing plate.
Figure 4B:
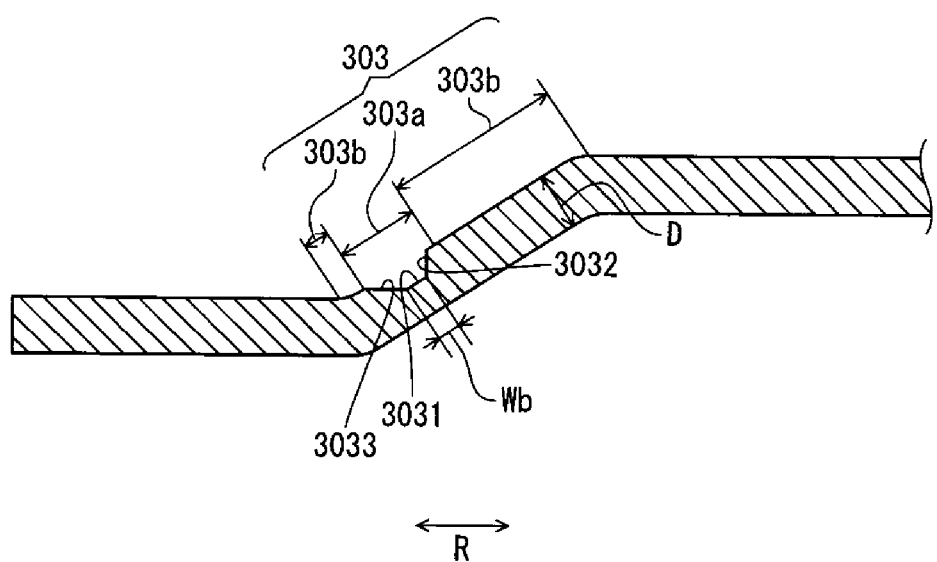
FIG. 4B is an enlarged schematic sectional view of a sealing plate according to still another exemplary embodiment of the present invention for showing a major part of the sealing plate.
Figure 4C:
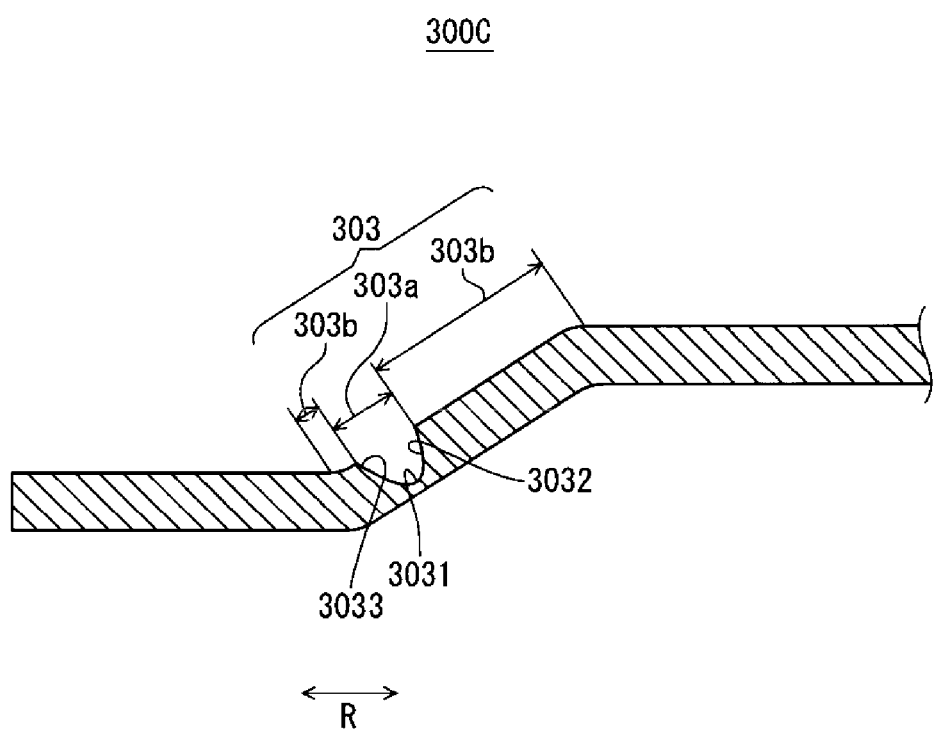
FIG. 4C is an enlarged schematic sectional view of a sealing plate according to a further exemplary embodiment of the present invention for showing a major part of the sealing plate.

Next, the thin portion will be specifically described with reference to FIGS. 4A to 4C. FIGS. 4A to 4C are enlarged schematic sectional views of another sealing plate according to the present exemplary embodiment for showing a major part of the sealing plate. In FIGS. 4A to 4C, an outer edge portion of the sealing plate that is used for fixing the sealing plate to the battery case is omitted.

Sealing plate 300A shown in FIG. 4A has the same configuration as the sealing plate shown in FIG. 3 except that the groove includes bottom portion 3031 with an arcuate shape. The radius of curvature of bottom portion 3031 may be equal to or larger than 0.01 mm and equal to or smaller than 1 mm.

Sealing plate 300B shown in FIG. 4B has the same configuration as that of the sealing plate shown in FIG. 3 except that the groove has a bottom portion 3031 with straight shape. The width Wb of bottom portion 3031 and the thickness D of base portion 303b satisfy a condition of Wb/D≤50%.

Sealing plate 300C shown in FIG. 4C has the same configuration as that of the sealing plate shown in FIG. 3 except that the groove has a U-shape which opens. The radius of curvature of bottom portion 3031 may be equal to or larger than 0.01 mm and equal to or smaller than 1 mm. The opening angle formed by first side surface portion 3032 and second side surface portion 3033 may equal to or larger than 30° and equal to or smaller than 120°.

Figure 5:
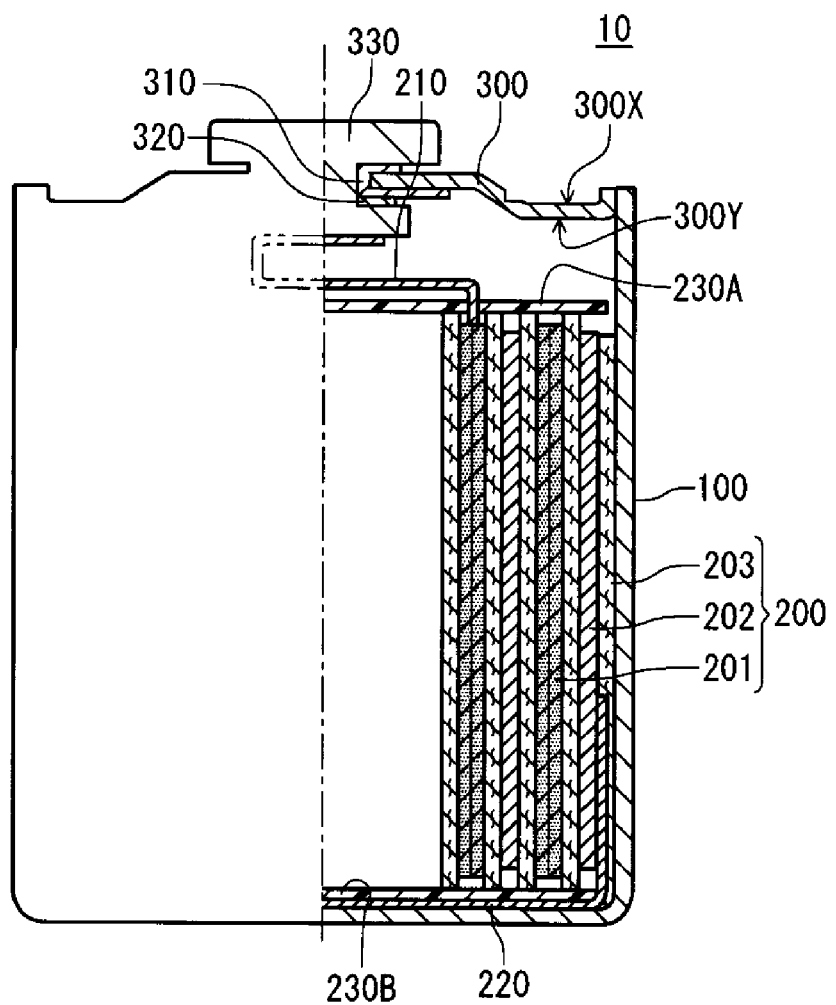
FIG. 5 is a schematic sectional view of the battery according to an exemplary embodiment of the present invention fore showing a major part of the battery.

FIG. 5 is schematic longitudinal sectional view of an example of hermetically sealed battery.

Battery 10 includes battery can 100 having a cylindrical shape with a bottom, cylindrical electrode body 200 accommodated in battery can 100, and sealing plate 300 sealing an opening of battery can 100. Sealing plate 300 is fixed to battery can 100 at a position closer to the opening of battery can 100 by, for example, a laser welding. Sealing plate 300 may be crimped near the opening of battery can 100.

The material of each of battery can 100 and sealing plate 300 may not particularly be limited. Each of battery can 100 and sealing plate 300 may, for example, be made of iron and/or iron alloy (including stainless steel), aluminum, or aluminum alloy (e.g., aluminum alloy containing a small amount of another metal such as manganese or copper).

Next, a configuration of electrode body 200 will be exemplary described with a lithium primary battery as an example.

Cylindrical electrode body 200 is of a wound type, which is produced by winding positive electrode 201 and negative electrode 202 with separator 203 in between to have a roll shape. One internal lead wire 210 is connected to one of positive electrode 201 and negative electrode 202 (positive electrode 201 in the illustrated example). Internal lead wire 210 is connected to external terminal 330 by, for example, welding. Another internal lead wire 220 is connected to the other of positive electrode 201 and negative electrode 202 (negative electrode 202 in the illustrated example). Internal lead wire 220 is connected to an inner surface of battery can 100 by, for example, welding.

Electrode body 200 is accommodated together with an electrolyte (not illustrated) in battery can 100. Upper insulating plate 230A and lower insulating plate 230B are disposed on the top and the bottom of electrode body 200, respectively, to prevent an internal short-circuiting.

Positive Electrode

The positive electrode contains a positive electrode active material. Manganese dioxide may be used as the positive electrode active material. The positive electrode includes a positive electrode collector and a positive electrode mixture layer attached to the positive electrode collector. The positive electrode mixture layer may contain the positive electrode active material, and, as a binder, a resin material such as fluorine resin. The positive electrode mixture layer may contain, as a conductive agent, a conductive material such as a carbon material. The positive electrode collector may, for example, be an expand metal, a net, or a punching metal, each being made of stainless steel.

Negative Electrode

The negative electrode contains a negative electrode active material. Metallic lithium or a lithium alloy may be used as the negative electrode active material. Metallic lithium or lithium alloy may be formed by an extrusion molding to have a long sheet shape to be used as the negative electrode. The lithium alloy that may be used includes Li—Al, Li—Sn, Li—Ni—Si, or Li—Pb. Among these alloys, the Li—Al alloy is preferable. From the viewpoint of securing an adequate discharge capacity and stabilization of the inner resistance, the amount of metal elements other than lithium contained in the lithium alloy may preferably be equal to or larger than 0.1 mass % and equal to or smaller than 5 mass %.

Separator

The separator may be preferably made of a microporous membrane made of a resin or a non-woven fabric. Materials (resins) that may preferably be used as the separator include, for example, polyolefin, polyamide, and polyamide imide.

Electrolyte

The electrolyte may employ a non-aqueous solvent in which a lithium salt is dissolved therein. The non-aqueous solvent may not particularly be limited, and may, for example, be propylene carbonate, ethylene carbonate, 1,2-dimethoxyethane, or γ-butyrolactone. Materials that can be used as the lithium salt include, for example, lithium borofluoride, lithium hexafluorophosphate, lithium trifluoromethanesulfonate, lithium bis(fluorosulfonyl)imide, and lithium bis(trifluoromethanesulfonyl)imide.

Hereinafter, the present invention will be specifically described based on Examples and Comparative Examples. It should not be construed, however, that the present invention is limited to the following Examples.

Example 1

(1) Production of Sealing Body

A sealing body (diameter of 17 mm) was produced.

A sealing plate (made of SUS316L) was pressed to form an inclined portion as shown in FIG. 2 and a groove (a thin portion) having a cross-sectional shape shown in FIG. 3. The inclined portion was located within a region that is inner than 33% of the total width W from the outer edge of the outer peripheral portion and within 54% of the total width W from the outer edge of the outer peripheral portion. The width W3 of the inclined portion was 22% of the total width W. The inclination angle A of the inclined portion was 45°.

The groove was formed such that the ratio of the height h to the height H is h/H=31%. The bottom of the groove had a point shape. The bent angle C of the groove was 270°. The opening angle B formed by the side surface portions of the groove was 90°. The width Wb of the bottom portion of the groove was 0.01 mm.

The thickness D1 of the outer peripheral portion, the thickness D2 of the inner peripheral portion, and the thickness D of the base portion were 0.2 mm. The thickness d of the thin portion was 0.05 mm.

A through-hole having a diameter of about 3 mm was formed in the center of the sealing plate. An external terminal was fixed in this through-hole to the sealing plate through an insulating gasket and a washer, thus providing the sealing body.

(2) Production of Positive Electrode

Ketjen black of 3.5 parts by mass as a conductive agent, polytetrafluoroethylene of 4.5 parts by mass as a binder, and a proper amount of pure water were added to electrolytic manganese dioxide of 92 parts by mass as a positive electrode active material, and then kneaded to prepare a positive electrode mixture in a wet state.

Next, a positive electrode collector made of an expand metal made of stainless steel was coated with the positive electrode mixture in the wet state to produce a positive electrode precursor. Then, the positive electrode precursor was dried, pressed by a roll pressing, and cut into pieces of a predetermined size to obtain positive electrodes with a strip shape.

(3) Production of Negative Electrode

A sheet-form Li—Al alloy (Al content: 0.3 mass %) was cut into pieces of a predetermined size each to obtain negative electrodes with a strop shape.

(4) Production of Electrode Group

The positive electrode mixture was removed from a part of the positive electrode so as to expose the positive electrode collector, and a positive electrode tab lead made of stainless steel was welded onto the exposed portion of the positive electrode collector. A negative electrode tab lead was welded onto a predetermined portion of the negative electrode. The positive electrode and the negative electrode were wound into a roll shape with a separator intervening between the positive electrode and the negative electrode, thereby providing the electrode group with a columnar shape. A microporous membrane made of polyethylene was used as the separator.

(5) Preparation of Electrolyte

In a non-aqueous solution in which propylene carbonate (PC), ethylene carbonate (EC), and 1, 2-dimethoxyethane (DME) were mixed at a volume ratio of 2:1:2, lithium trifluoromethanesulfonate as a lithium salt was dissolved by a concentration of 0.5 mols/litter to prepare the electrolyte.

(6) Fabrication of Cylindrical Battery

The electrode group was inserted into the inside of the battery can having a cylindrical shape with a bottom (made of SUS316L) while a lower insulating plate with a ring shape was disposed at the bottom of the can. The negative electrode tab lead was welded to the inner bottom surface of the battery can, and an upper insulating plate with a ring shape was disposed on the top of the electrode group. After that, the positive electrode tab lead was welded to the external terminal fixed to the sealing plate. Next, the electrolyte was put into the battery can. Then, the sealing plate was welded by a laser welding to the battery can at a part of the battery can close to the opening of the battery can. In the manner describe above, ten (10) hermetically sealed cylindrical lithium batteries having the structure as shown in FIG. 4 were produced. Other ten (10) hermetically sealed batteries for evaluation were produced in the same manner as above except that the electrode group and the electrolyte were not accommodated in the battery can.

Evaluation of Operating Pressure

A hole was bored in the side surface of the battery can of each battery for evaluation. Water was put from the hole into the battery can so as to raise the pressure inside the battery by the water pressure to operate the explosion-proof function.

An average (n=10), a standard deviation ($\sigma$), and a value of average+6$\sigma$ were calculated. The results are shown in Table 1. It can be said that the operating pressure is low and the variation in the operating pressure is small in a case that the standard deviation $\sigma$ is equal to or smaller than 0.22, preferably equal to or smaller than 0.20, and more preferably equal to or smaller than 0.15, and that the average+6$\sigma$ is equal to or smaller than 6.5 MPa.

Comparative Example 1

Sealing plates were produced in the same manner as Example 1 except that, in process (1) in Production of Sealing Body, the inner peripheral portion was deviated toward the inside of the battery can to form an inclined portion, and that the entire inclined portion was formed as a thin portion having a uniform thickness with a strip shape. The inclination angle was 45°. The width Wb of the bottom portion of the groove (the width of the thin portion) was 0.37 mm.

Figure 6:
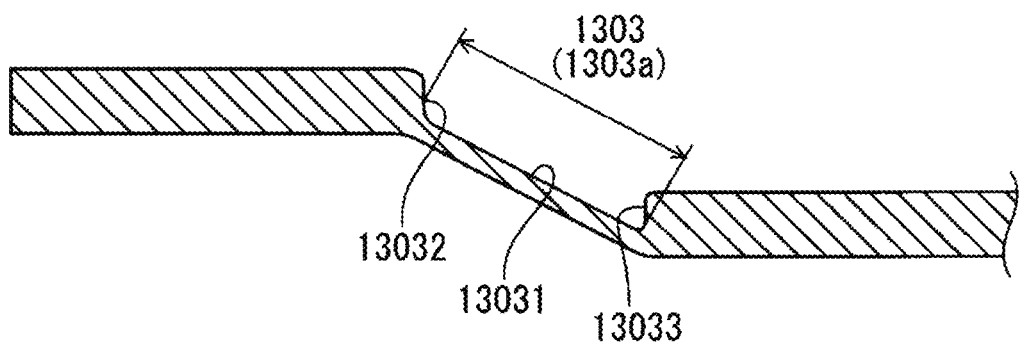
FIG. 6 is an enlarged schematic sectional view of a sealing plate produced in Comparative Example 2 for showing a major part of the sealing plate.

FIG. 6 is an enlarged schematic sectional view of the sealing plate produced in Comparative Example 1 for showing a major part of the sealing plate. Thin portion 1303$a$ had a strip shape. The width of bottom portion 13031 of thin portion 1303$a$ was the same as the width of inclined portion 1303. The first and second side surface portions 13032 and 13033 were substantially parallel to each other.

Including the obtained sealing plates, ten (10) cylindrical lithium batteries and ten (10) batteries for evaluation were produced and evaluated in the same manner as Example 1. The results are shown in Table 1. Since the inclination direction is opposite to that of Example 1, the inclination angle A in Table 1 is indicated as −45°.

Comparative Example 2

Sealing plates were produced in the same manner as Comparative Example 1 except that, in process (1) of Production of Sealing Body, the inclination angle A was 0°. The width Wb of the bottom portion of the groove (the width of the thin portion) was 0.72 mm.

Comparative Example 3

Sealing plates were produced in the same manner as Comparative Example 1 except that, in process (1) of Production of Sealing Body, the inclination direction was made the same as that of Example 1. The inclination angle A was 25°. The width Wb of the bottom portion of the groove (the width of the thin portion) was 0.61 mm. Including the obtained sealing plates, ten (10) cylindrical lithium batteries and ten (10) batteries for evaluation were produced and evaluated in the same manner as Example 1. The results are shown in Table 1.

Comparative Example 4

Sealing plates were produced in the same manner as Comparative Example 3 except that, in process (1) of Production of Sealing Body, the inclination angle A was 45° and that the width Wb of the bottom portion of the groove (the width of the thin portion) was 0.36 mm. Including the obtained sealing plates, ten (10) cylindrical lithium batteries and ten (10) batteries for evaluation were produced and evaluated in the same manner as Example 1. The results are shown in Table 1.

TABLE 1

| | Inclination Angle A ° | Width W of Bottom Portion ° | h/H | Operation Pressure (MPa) | | |
|---|---|---|---|---|---|---|
| | | | | Average MPa | σ — | Average + 6σ MPa |
| Comparative Example 1 | −45 | 0.37 | 45% | 7.0 | 0.18 | 8.08 |
| Comparative Example 2 | 0 | 0.72 | — | 6.3 | 0.21 | 7.56 |
| Comparative Example 3 | 25 | 0.61 | 53% | 5.6 | 0.22 | 6.92 |
| Comparative Example 4 | 45 | 0.36 | 53% | 5.3 | 0.23 | 6.68 |
| Example 1 | 45 | 0.01 | 31% | 4.9 | 0.13 | 5.68 |

Example 1 exhibits the average of the operating pressure equal to or smaller than 5 MPa, the standard deviation σ equal to or smaller than 0.15, average+6σ equal to or smaller than 6.5 MPa. Accordingly, the operating pressure is low and the variation in the operating pressure is small. Comparative Examples 1 to 4 exhibit, on the other hand, all of the average of the operating pressure, the standard deviation σ, and average+6σ are higher than those of Example 1. Especially, average+6σ is particularly larger, which means that the variation of the operating pressure is large.

Example 2

Sealing plates were produced in the same manner as Example 1 except that, in process (1) of Production of Sealing Body, the inclination angle A was 15°. Including the obtained sealing plates, ten (10) cylindrical lithium batteries and ten (10) batteries for evaluation were produced and evaluated in the same manner as Example 1. The results are shown in Table 2.

Example 3

Sealing plates were produced in the same manner as Example 1 except that, in process (1) of Production of Sealing Body), the inclination angle A was 25°. Including the obtained sealing plates, ten (10) cylindrical lithium batteries and ten (10) batteries for evaluation were produced and evaluated in the same manner as Example 1. The results are shown in Table 2.

Example 4

Sealing plates were produced in the same manner as Example 1 except that, in process (1) of Production of Sealing Body, the inclination angle A was 35°. Including the obtained sealing plates, ten (10) cylindrical lithium batteries and ten (10) batteries for evaluation were produced and evaluated in the same manner as Example 1. The results are shown in Table 2.

Example 5

Sealing plates were produced in the same manner as Example 1 except that, in process (1) of Production of Sealing Body, the inclination angle A was 55°. Including the obtained sealing plates, ten (10) cylindrical lithium batteries and ten (10) batteries for evaluation were produced and evaluated in the same manner as Example 1. The results are shown in Table 2.

Example 6

Sealing plates were produced in the same manner as Example 1 except that, in process (1) of Production of Sealing Body, the inclination angle A was 65°. Including the obtained sealing plates, ten (10) cylindrical lithium batteries and ten (10) batteries for evaluation were produced and evaluated in the same manner as Example 1. The results are shown in Table 2.

Example 7

Sealing plates were produced in the same manner as Example 1 except that, in process (1) of Production of Sealing Body, the inclination angle A was 75°. Including the obtained sealing plates, ten (10) cylindrical lithium batteries and ten (10) batteries for evaluation were produced and evaluated in the same manner as Example 1. The results are shown in Table 2.

Example 8

Sealing plates were produced in the same manner as Example 1 except that, in process (1) of Production of Sealing Body, the inclination angle A was 85°. Including the obtained sealing plates, ten (10) cylindrical lithium batteries and ten (10) batteries for evaluation were produced and evaluated in the same manner as Example 1. The results are shown in Table 2.

Comparative Example 5

Sealing plates were produced in the same manner as Example 1 except that, in process (1) of Production of Sealing Body, the inclination angle A was 0°. Including the obtained sealing plates, ten (10) cylindrical lithium batteries and ten (10) batteries for evaluation were produced and evaluated in the same manner as Example 1. The results are shown in Table 2.

TABLE 2

| | Inclination Angle A ° | Width W of Bottom Portion ° | h/H | Operation Pressure (MPa) | | |
|---|---|---|---|---|---|---|
| | | | | Average MPa | σ — | Average + 6σ MPa |
| Comparative Example 5 | 0 | 0.01 | 31% | 5.4 | 0.21 | 6.66 |
| Example 2 | 15 | 0.01 | 31% | 5.3 | 0.20 | 6.50 |
| Example 3 | 25 | 0.01 | 31% | 5.1 | 0.17 | 6.12 |
| Example 4 | 35 | 0.01 | 31% | 5.0 | 0.14 | 5.84 |
| Example 1 | 45 | 0.01 | 31% | 4.9 | 0.13 | 5.68 |
| Example 5 | 55 | 0.01 | 31% | 5.0 | 0.14 | 5.84 |
| Example 6 | 65 | 0.01 | 31% | 5.1 | 0.16 | 6.06 |
| Example 7 | 75 | 0.01 | 31% | 5.1 | 0.19 | 6.24 |
| Example 8 | 85 | 0.01 | 31% | 5.2 | 0.20 | 6.40 |

Examples 1 to 8 exhibit the average of the operating pressure equal to or smaller than 5.5 MPa, the standard deviation σ equal to or smaller than 0.20, the value of average+6σ equal to or smaller than 6.5 MPa. In particular, the standard deviations of Example 1 and Examples 3 to 7 are relatively small, which means that the variation of the operating pressure is effectively suppressed. Comparative Example 5 exhibits, on the other hand, the value of average+6σ exceeding 6.5 MPa.

Example 9

Sealing plates were produced in the same manner as Example 1 except that, in process (1) of Production of Sealing Body, the position of the groove was changed such that the value of h/H became 25%. Including the obtained sealing plates, ten (10) cylindrical lithium batteries and ten (10) batteries for evaluation were produced and evaluated in the same manner as Example 1. The results are shown in Table 3.

Example 10

Sealing plates were produced in the same manner as Example 1 except that, in process (1) of Production of Sealing Body, the position of the groove was changed such that the value of h/H became 44%. Including the obtained sealing plates, ten (10) cylindrical lithium batteries and ten (10) batteries for evaluation were produced and evaluated in the same manner as Example 1. The results are shown in Table 3.

Example 11

Sealing plates were produced in the same manner as Example 1 except that, in process (1) of Production of Sealing Body, the position of the groove was changed such that the value of h/H became 56%. Including the obtained sealing plates, ten (10) cylindrical lithium batteries and ten (10) batteries for evaluation were produced and evaluated in the same manner as Example 1. The results are shown in Table 3.

Example 12

Sealing plates were produced in the same manner as Example 1 except that, in process (1) of Production of Sealing Body, the position of the groove was changed such that the value of h/H became 69%. Including the obtained sealing plates, ten (10) cylindrical lithium batteries and ten (10) batteries for evaluation were produced and evaluated in the same manner as Example 1. The results are shown in Table 3.

TABLE 3

| | Width W | | | Operation Pressure (MPa) | | |
|---|---|---|---|---|---|---|
| | Inclination Angle A ° | of Bottom Portion ° | h/H | Average MPa | σ | Average + 6σ MPa |
| Example 9 | 45 | 0.01 | 25% | 4.8 | 0.12 | 5.52 |
| Example 1 | 45 | 0.01 | 31% | 4.9 | 0.14 | 5.74 |
| Example 10 | 45 | 0.01 | 44% | 4.9 | 0.18 | 5.98 |
| Example 11 | 45 | 0.01 | 56% | 5.0 | 0.20 | 6.20 |
| Example 12 | 45 | 0.01 | 69% | 5.1 | 0.21 | 6.36 |

Example 1 and Examples 9 to 12 exhibit the average of the operating pressure equal to or smaller than 5.5 MPa, the standard deviation σ equal to or smaller than 0.21, and the value of average+6σ equal to or smaller than 6.5 MPa. Especially, the values of average+6σ of Examples 1, 9 and 10 are relatively small, thus reducing the variation in the operating pressure.

INDUSTRIAL APPLICABILITY

A hermetically sealed battery according to the present invention has a stable explosion-proof function, and is suitable as a power source for various electronic equipment.

REFERENCE MARKS IN THE DRAWINGS 10 battery
100 battery can
200 electrode body
201 positive electrode
202 negative electrode
203 separator
210, 220 internal lead wire
230A upper insulating plate
230B lower insulating plate
300, 300A, 300B, 300C sealing plate
300X first main surface
300Y second main surface
301 outer peripheral portion
302 inner peripheral portion
303 inclined portion
303a thin portion
3031 bottom portion
3032 first side surface portion
3033 second side surface portion
303b base portion
310 gasket
320 washer
330 external terminal
1303 inclined portion (thin portion)
13031 bottom portion
13032 first side surface portion
13033 second side surface portion

The invention claimed is:
1. A hermetically sealed battery comprising:
a battery can having a cylindrical shape with a bottom and an opening;
an electrode body accommodated in the battery can; and
a sealing plate sealing the opening of the battery can, wherein the sealing plate has a first main surface and a second main surface opposite to the first main surface, the first main surface facing an outside of the battery can, the sealing plate including an outer peripheral portion having a flat plate shape, an inner peripheral portion having a flat plate shape, an inclined portion provided between the outer peripheral portion and the inner peripheral portion,
the inclined portion is inclined such that the inner peripheral portion is positioned on an outer side of the battery can than the outer peripheral portion,
the inclined portion including a thin portion and base portions, each base portion thicker than the thin portion, and
the thin portion is interposed between the base portions in a radial direction of the sealing plate.
2. The hermetically sealed battery according to claim 1, wherein the first main surface has a groove provided therein at the inclined portion, the groove constituting the thin portion and having an arcuate shape when viewed in a thickness direction of the sealing plate.
3. The hermetically sealed battery according to claim 2, wherein a height h from the second main surface at the outer peripheral portion to a bottom of the groove and a height H from the second main surface at the outer peripheral portion to the first main surface at the inner peripheral portion satisfy a condition of h/H≤45%.

4. The hermetically sealed battery according to claim 2, wherein a width Wb of the bottom of the groove and a thickness D of the base portions satisfy a condition of Wb/D≤50%.

5. The hermetically sealed battery according to claim 2, wherein
    a central angle C of the groove is equal to or larger than 60° and equal to or smaller than 270°,
    wherein the central angle C is an angle formed by a straight line that is drawn in the radial direction to pass through one end of the groove in a circumferential direction of the groove and a straight line drawn in another radial direction of the sealing plate to pass through another end of the groove in the circumferential direction of the groove.

6. The hermetically sealed battery according to claim 2, wherein
    an inner wall of the groove includes a bottom portion, a first side surface portion, and a second side surface portion, each of the first side surface portion and the second side surface portion connecting the bottom portion to the first main surface, and
    the first side surface portion and the second side surface portion are inclined such that a width of the groove increases from the bottom portion to the first main surface.

7. The hermetically sealed battery according to claim 6, wherein an angle B formed by the first side surface portion and the second side surface portion is equal to or larger than 30° and equal to or smaller than 120°.

8. The hermetically sealed battery according to claim 1, wherein an exterior angle A formed by a part of the second main surface at the outer peripheral portion and a part of the second main surface at the inclined portion is equal to or larger than 25° and equal to or smaller than 75°.

9. A hermetically sealed battery comprising:
    a battery can having a cylindrical shape with a bottom and an opening;
    an electrode body accommodated in the battery can; and
    a sealing plate sealing the opening of the battery can,
    wherein the sealing plate has a first main surface and a second main surface opposite to the first main surface, the first main surface facing an outside of the battery can, the sealing plate including an outer peripheral portion having a flat plate shape, an inner peripheral portion having a flat plate shape, an inclined portion provided between the outer peripheral portion and the inner peripheral portion,
    the inclined portion is inclined such that the inner peripheral portion is positioned on an outer side of the battery can than the outer peripheral portion, the inclined portion including a thin portion and a base portion thicker than the thin portion, the thin portion and the base portion being arranged in a radial direction of the sealing plate, and
    the first main surface has a groove provided therein at the inclined portion, the groove constituting the thin portion and having an arcuate shape when viewed in a thickness direction of the sealing plate.

10. The hermetically sealed battery according to claim 9, wherein a height h from the second main surface at the outer peripheral portion to a bottom of the groove and a height H from the second main surface at the outer peripheral portion to the first main surface at the inner peripheral portion satisfy a condition of h/H≤45%.

11. The hermetically sealed battery according to claim 9, wherein a width Wb of the bottom of the groove and a thickness D of the base portion satisfy a condition of Wb/D≤50%.

12. The hermetically sealed battery according to claim 9, wherein
    a central angle C of the groove is equal to or larger than 60° and equal to or smaller than 270°,
    wherein the central angle C is an angle formed by a straight line that is drawn in the radial direction to pass through one end of the groove in a circumferential direction of the groove and a straight line drawn in another radial direction of the sealing plate to pass through another end of the groove in the circumferential direction of the groove.

13. The hermetically sealed battery according to claim 9, wherein
    an inner wall of the groove includes a bottom portion, a first side surface portion, and a second side surface portion, each of the first side surface portion and the second side surface portion connecting the bottom portion to the first main surface, and
    the first side surface portion and the second side surface portion are inclined such that a width of the groove increases from the bottom portion to the first main surface.

14. The hermetically sealed battery according to claim 13, wherein an angle B formed by the first side surface portion and the second side surface portion is equal to or larger than 30° and equal to or smaller than 120°.

15. The hermetically sealed battery according to claim 9, wherein an exterior angle A formed by a part of the second main surface at the outer peripheral portion and a part of the second main surface at the inclined portion is equal to or larger than 25° and equal to or smaller than 75°.

* * * * *